United States Patent
Oba et al.

(10) Patent No.: US 8,331,408 B2
(45) Date of Patent: Dec. 11, 2012

(54) FIBER LASER DEVICE

(75) Inventors: Yasuhiro Oba, Sakura (JP); Michihiro Nakai, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/345,133

(22) Filed: Jan. 6, 2012

(65) Prior Publication Data

US 2012/0163402 A1 Jun. 28, 2012

Related U.S. Application Data

(63) Continuation of application No. PCT/JP2010/061443, filed on Jul. 6, 2010.

(30) Foreign Application Priority Data

Jul. 7, 2009 (JP) .................. 2009-161254

(51) Int. Cl.
*H01S 3/30* (2006.01)
*H01S 3/10* (2006.01)
*H01S 3/13* (2006.01)
*H01S 3/00* (2006.01)

(52) U.S. Cl. ........... 372/6; 372/21; 372/22; 372/29.014; 372/38.02

(58) Field of Classification Search ........... 372/6, 21, 372/22, 29.01, 29.014, 38.02
See application file for complete search history.

(56) References Cited

U.S. PATENT DOCUMENTS 6,058,126 A 5/2000 Ishikawa et al.
2007/0147441 A1 6/2007 Tominaga et al.

FOREIGN PATENT DOCUMENTS

| JP | 11-026857 A | 1/1999 |
| JP | 2004-337970 A | 12/2004 |
| JP | 2007-142380 A | 6/2007 |
| JP | 2008-091773 A | 4/2008 |

OTHER PUBLICATIONS

International Search Report of PCT/JP2010/061443, mailing date Aug. 3, 2010.

*Primary Examiner* — Armando Rodriguez
(74) *Attorney, Agent, or Firm* — Westerman, Hattori, Daniels & Adrian, LLP

(57) ABSTRACT

The invention relates to a fiber laser device 100. In the preliminary pumping state, the laser light is not output from the seed laser light source 10, the pumping light is output from the pumping light source 10, and the pumping light has such an intensity that the wavelength of the laser light emitted and output from the amplification optical fiber 30 is not converted by the wavelength converter 71. In the output state, the laser light is output from the seed laser light source 10, the pumping light is output from the pumping light source 20, and the laser light and the pumping light have such intensities that the wavelength of the laser light amplified and output by the amplification optical fiber 30 is converted by the wavelength converter 71.

10 Claims, 4 Drawing Sheets

FIBER LASER DEVICE

TECHNICAL FIELD

The invention relates to a fiber laser device.

BACKGROUND ART

In recent years, fiber laser devices are used in machines for machining utilizing laser light and in medical devices such as a surgical knife utilizing laser light. A fiber laser device is a device in which laser light and pumping light emitted by a laser oscillator are input to an amplification optical fiber and amplified laser light is output from an output section.

In such a fiber laser device, a certain period of time is required from a point when the fiber laser device starts outputting the laser light until the intensity of the laser light is stabilized. In other words, a certain period of time is required for the laser light to rise.

The work efficiency is higher as the rise time of the laser light is shorter. Patent Document 1 listed below discloses such a fiber laser device that is stated to achieve a short period until the intensity of laser light is stabilized.

In the fiber laser device disclosed in Patent Document 1, constant low-intensity pumping light is input to an amplification optical fiber during a period (standby state period) before laser light is output from the fiber laser device to pump rare earth elements doped in the amplification optical fiber. Subsequently, seed laser light and high-intensity pumping light are input to the amplification optical fiber at the time when the laser light is output from the fiber laser device, the seed laser light is amplified and the amplified laser light is output. It is stated that the rise time of the laser light output from the fiber laser device is short since the rare earth elements of the amplification optical fiber are pumped in advance in this manner when the laser light is output from the fiber laser device (Patent Document 1).

CITATION LIST

Patent Document

[Patent Document 1] Japanese Patent Application Laid-Open No. 2008-91773

SUMMARY OF THE INVENTION

Objects to be Achieved by the Invention

However, in the fiber laser device disclosed in Patent Document 1, since the pumping light is input to the amplification optical fiber in a standby state, the rare earth elements of the amplification optical fiber emit spontaneous emission light and the spontaneous emission light amplified by the amplification optical fiber may be output.

Therefore, an object to be achieved by the invention is to provide a fiber laser device capable of shortening the rise time of laser light that is output and suppressing light output except for the output period.

Means for Achieving the Objects

A fiber laser device according to the invention includes: a seed laser light source configured to output seed laser light; a pumping light source configured to output pumping light; an amplification optical fiber to which the seed laser light and the pumping light are input and which is configured to amplify the seed laser light and output the amplified light as laser light, wherein the amplification optical fiber is doped with rare earth elements that are pumped by the pumping light; a wavelength converter to which the laser light output from the amplification optical fiber is input and which is configured to convert a wavelength of light having an intensity equal to or higher than a predetermined intensity; a wavelength selecting filter to which the laser light output from the wavelength converter is input and which is configured to transmit light whose wavelength is converted by the wavelength converter and to suppress transmission of light whose wavelength is not converted by the wavelength converter when light in the same wavelength band as the seed laser light is input to the wavelength converter; an output section configured to output laser light output from the wavelength selecting filter; and a controller configured to control at least the seed laser light source and the pumping light source, wherein the controller controls the seed laser light source and the pumping light source to change from a preliminary pumping state to an output state, in the preliminary pumping state, the seed laser light is not output from the seed laser light source, the pumping light is output from the pumping light source, and the pumping light has such an intensity that the wavelength of light emitted by the pumping light in the amplification optical fiber is not converted by the wavelength converter, and in the output state, the seed laser light is output from the seed laser light source, the pumping light is output from the pumping light source, and the seed laser light and the pumping light have such intensities that the wavelength of the laser light output from the amplification optical fiber is converted by the wavelength converter.

According to such a fiber laser device, the controller controls the seed laser light source so that the seed laser light is not output and controls the pumping light source so that the pumping light is input to the amplification optical fiber in the preliminary pumping state. Accordingly, the pumped state of the rare earth elements of the amplification optical fiber becomes gradually higher. The amplification optical fiber is configured to amplify the seed laser light output from the seed laser light source by the stimulated emission of the rare earth elements pumped by the pumping light. However, in the preliminary pumping state, since the seed laser light is not input to the amplification optical fiber, only the spontaneous emission light emitted by the pumped rare earth elements is output from the amplification optical fiber. It is known that the spontaneous emission light has a wide spectrum width and a small peak value of the intensity. In addition, in the preliminary pumping state, the intensity of the pumping light is controlled so that even when light obtained by amplifying the spontaneous emission light is output from the amplification optical fiber, the wavelength of the output light is not converted by the wavelength converter. Thus, even when the spontaneous emission light is amplified and output, transmission of the light output from the wavelength converter and input to the wavelength selecting filter is suppressed by the wavelength selecting filter. Accordingly, output of unnecessary light from the output section can be suppressed in the preliminary pumping state.

Next, the controller controls the pumping light source and the seed laser light source so that the pumping light and the seed laser light are input to the amplification optical fiber in the output state. At this time, the seed laser light source and the pumping light source are controlled so that the light amplified by the amplification optical fiber and output therefrom as the laser light has such an intensity that the wavelength thereof is converted by the wavelength converter. The laser light whose wavelength is converted by the wavelength converter is input to the wavelength selecting filter, transmitted through the wavelength selecting filter and output from the output section. In this case, since the rare earth elements of the amplification optical fiber are pumped in the preliminary pumping state, the rise time of the laser light output from the output section can be shortened in the output state after the preliminary pumping state.

Alternatively, a fiber laser device according to the invention includes: a seed laser light source configured to output seed laser light; a pumping light source configured to output pumping light; an amplification optical fiber to which the seed laser light and the pumping light are input and which is configured to amplify the seed laser light and output the amplified light as laser light, wherein the amplification optical fiber is doped with rare earth elements that are pumped by the pumping light; a wavelength converter to which the laser light output from the amplification optical fiber is input and which is configured to convert a wavelength of light having an intensity equal to or higher than a predetermined intensity; a wavelength selecting filter to which the laser light output from the wavelength converter is input and which is configured to transmit light whose wavelength is converted by the wavelength converter and to suppress transmission of light whose wavelength is not converted by the wavelength converter when light in the same wavelength band as the seed laser light is input to the wavelength converter; an output section configured to output laser light output from the wavelength selecting filter; and a controller configured to control at least the seed laser light source and the pumping light source, wherein the controller controls the seed laser light source and the pumping light source to change from a preliminary pumping state to an output state, in the preliminary pumping state, the seed laser light is output from the seed laser light source, the pumping light is output from the pumping light source, and the seed laser light and the pumping light have such intensities that the wavelength of the laser light output from the amplification optical fiber is not converted by the wavelength converter, and in the output state, the seed laser light is output from the seed laser light source, the pumping light is output from the pumping light source, and the seed laser light and the pumping light have such intensities that the wavelength of the laser light output from the amplification optical fiber is converted by the wavelength converter.

According to such a fiber laser device, the seed laser light is input to the amplification optical fiber in the preliminary pumping state, and it is thus possible to balance between the pumping of the rare earth elements by the pumping light and relaxation of the rare earth elements by the seed laser light. Therefore, it is possible to prevent the rare earth elements from being pumped until they become unstable and prevent unintended laser oscillation in the preliminary pumping state.

The seed laser light input to the amplification optical fiber is amplified by the stimulated emission caused by the rare earth elements of the amplification optical fiber and input to the wavelength converter. However, in the preliminary pumping state, the seed laser light output from the seed laser light source and the pumping light output from the pumping light source have such intensities that the wavelength of the laser light output from the amplification optical fiber is not converted by the wavelength converter. Thus, the laser light output from the amplification optical fiber is input from the wavelength converter to the wavelength selecting filter, but is not transmitted through the wavelength selecting filter. Accordingly, output of unnecessary light can be suppressed in the preliminary pumping state.

Further, in the fiber laser device, the controller may control the seed laser light source and the pumping light source to change from the output state to the preliminary pumping state.

Further, in the fiber laser device, the seed laser light in the output state may be pulsed light and the seed laser light in the preliminary pumping state may be continuous light.

Further, in the fiber laser device, the intensity of the pumping light in the preliminary pumping state may be equal to or lower than the intensity of the pumping light in the output state.

Alternatively, a fiber laser device according to the invention includes: a seed laser light source configured to output seed laser light; a pumping light source configured to output pumping light; an amplification optical fiber to which the seed laser light and the pumping light are input and which is configured to amplify the seed laser light and output the amplified light as laser light, wherein the amplification optical fiber is doped with rare earth elements that are pumped by the pumping light; a wavelength converter to which the laser light output from the amplification optical fiber is input and which is configured to convert a wavelength of light having an intensity equal to or higher than a predetermined intensity; a wavelength selecting filter to which the laser light output from the wavelength converter is input and which is configured to transmit light whose wavelength is converted by the wavelength converter and to suppress transmission of light whose wavelength is not converted by the wavelength converter when light in the same wavelength band as the seed laser light is input to the wavelength converter; an output section configured to output laser light output from the wavelength selecting filter; and a controller configured to control at least the seed laser light source and the pumping light source, wherein the controller controls the seed laser light source and the pumping light source to change from a first preliminary pumping state to a second preliminary pumping state and from the second preliminary pumping state to an output state, in the first preliminary pumping state, the seed laser light is not output from the seed laser light source, the pumping light is output from the pumping light source, and the pumping light has such an intensity that the wavelength of light emitted by the pumping light in the amplification optical fiber is not converted by the wavelength converter, in the second preliminary pumping state, the seed laser light is output from the seed laser light source, the pumping light is output from the pumping light source, and the seed laser light and the pumping light have such intensities that the wavelength of the laser light output from the amplification optical fiber is not converted by the wavelength converter, and in the output state, the seed laser light is output from the seed laser light source, the pumping light is output from the pumping light source, and the seed laser light and the pumping light have such intensities that the wavelength of the laser light output from the amplification optical fiber is converted by the wavelength converter.

According to such a fiber laser device, the rare earth elements are highly pumped in the first preliminary pumping state, and it is thus possible to prevent the rare earth elements from being pumped until they become unstable by the seed laser light in the second preliminary pumping state. Therefore, since the pumping of the rare earth elements is stable and high when the output state is entered, it is possible to shorten the rise time of the laser light.

In the fiber laser device, it is preferable that the controller control the seed laser light source and the pumping light source to change from the output state to the first preliminary pumping state.

With such a configuration, it is possible to further shorten the rise time of the laser light when the output state is entered next.

Further, in the fiber laser device, the seed laser light in the output state may be pulsed light and the seed laser light in the second preliminary pumping state may be continuous light.

Further, in the fiber laser device, the intensity of the pumping light in the first preliminary pumping state may be equal to or lower than the intensity of the pumping light in the output state.

Further, in the fiber laser device, the intensity of the pumping light in the second preliminary pumping state may be equal to the intensity of the pumping light in the output state.

Effect of the Invention

According to the invention, a fiber laser device capable of shortening the rise time of output laser light and suppressing light output except for the output period can be provided.

BEST MODE FOR CARRYING OUT THE INVENTION

Figure 1:
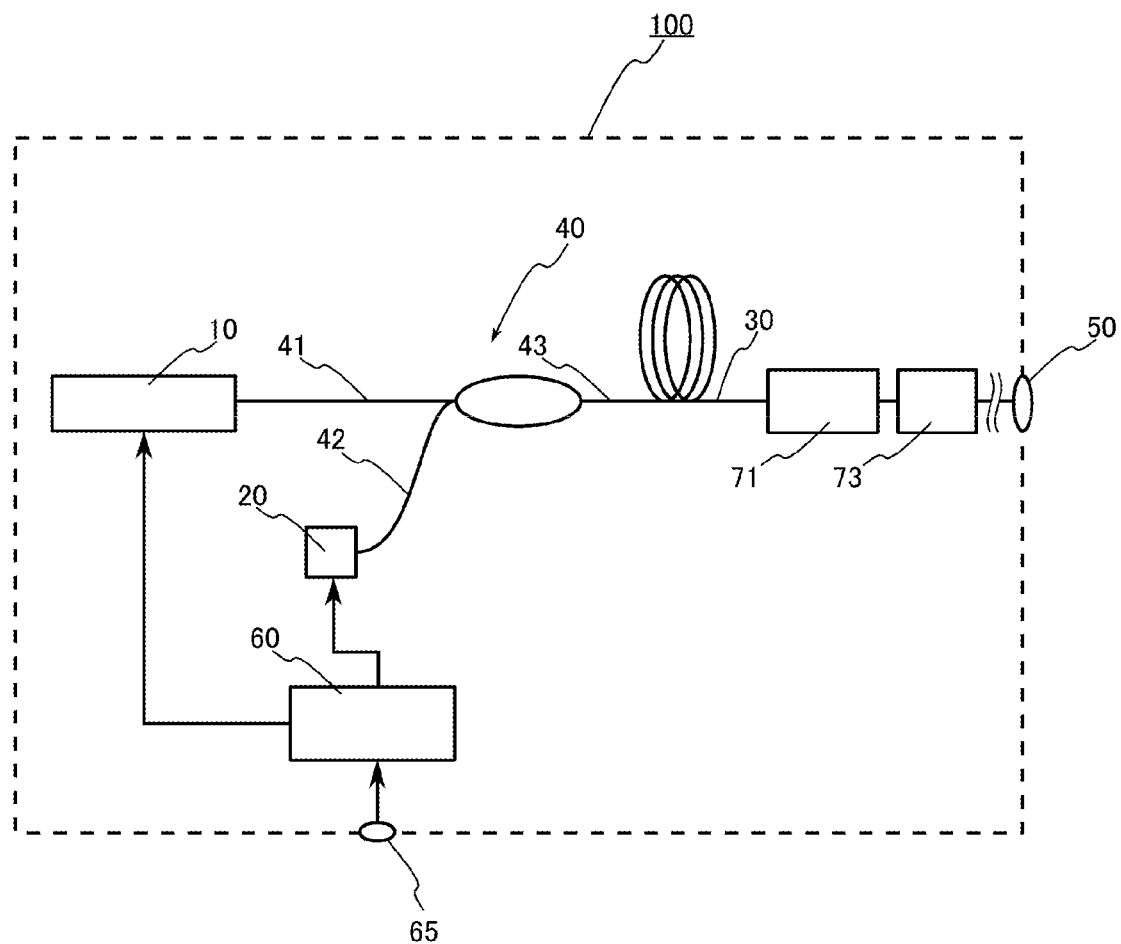
FIG. 1 is a diagram showing a fiber laser device according to a first embodiment of the invention.

Preferable embodiments of a fiber laser device according to the invention will be described in detail below referring to the drawings.

First Embodiment

FIG. 1 is a diagram showing a fiber laser device according to a first embodiment of the invention.

As shown in FIG. 1, a fiber laser device 100 includes as main components: a seed laser light source 10 configured to output seed laser light having a wavelength $\lambda 1$; a pumping light source 20 configured to output pumping light; an amplification optical fiber 30 to which the pumping light and the seed laser light are input; an optical coupler 40 configured to input the pumping light and the seed laser light to the amplification optical fiber 30; a wavelength converter 71 configured to convert the wavelength of light output from the amplification optical fiber 30; a wavelength selecting filter 73 configured to transmit or suppress transmission of light output from the wavelength converter 71; an output section 50 configured to output light output from the wavelength selecting filter 73; a controller 60 configured to control the seed laser light source 10 and the pumping light source 20; and an output instruction section 65 configured to input an output instruction to the controller 60 to output laser light from the output section 50.

Figure 2:
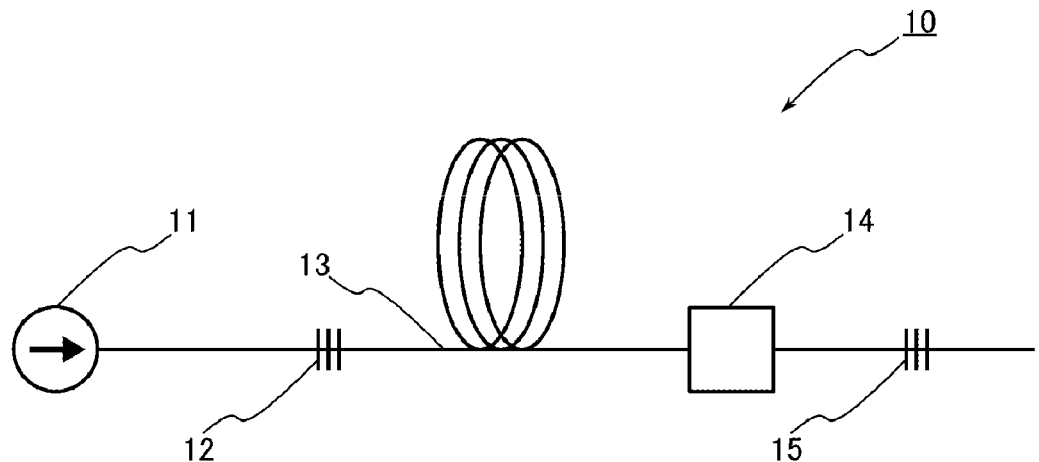
FIG. 2 is a diagram showing a seed laser light source of FIG. 1.

FIG. 2 is a diagram showing the seed laser light source 10 of FIG. 1. In this embodiment, a laser output device of fabry-perot type is used as the seed laser light source 10. As shown in FIG. 2, the seed laser light source 10 includes: a laser oscillator 11 configured to output pumping light; a rare earth-doped fiber 13 to which the pumping light from the laser oscillator 11 is input; a first fiber bragg grating (FBG) 12 interposed between the rare earth-doped fiber 13 and the laser oscillator 11; a second FBG 15 provided on the side opposite to the laser oscillator 11 with respect to the rare earth-doped fiber 13; and an acoustic optical modulator (AOM) 14 provided between the second FBG 15 and the rare earth-doped fiber 13.

The laser oscillator 11 is a semiconductor laser, for example, and is configured to output pumping light. The output pumping light has a wavelength of 975 nm, for example. The pumping light output from the laser oscillator 11 is input to the rare earth-doped fiber 13 through the first FBG 12. A rare earth such as ytterbium is doped in the rare earth-doped fiber 13. In the rare earth-doped fiber 13, the pumping light is absorbed by the rare earth elements doped in the rare earth-doped fiber 13. Accordingly, the earth elements are pumped. Then, the pumped rare earth elements emit spontaneous emission light of a predetermined wavelength $\lambda 1$. The wavelength $\lambda 1$ of the spontaneous emission light in this case may be 1064 nm, for example. The spontaneous emission light propagates through the rare earth-doped fiber 13 and is input to the AOM 14. The AOM 14 may be controlled to periodically repeat a low loss state and a high loss state, or to keep a low loss state.

If the AOM 14 is controlled to periodically repeat a low loss state and a high loss state, the AOM 14 suppresses transmission of the spontaneous emission light in the high loss state and transmits the spontaneous emission light in the low loss state. Thus, when the AOM 14 is in a low loss state, the spontaneous emission light is input to the second FBG 15 through the AOM 14. The second FBG 15 reflects light in the same wavelength band as the wavelength $\lambda 1$ of the spontaneous emission light emitted in the rare earth-doped fiber at a reflectance of about 50% or less. Accordingly, the reflected spontaneous emission light is input again to the rare earth-doped fiber 13 through the AOM 14, and amplified by stimulated emission caused by the rare earth elements in the rare earth-doped fiber 13. The amplified light then reaches the first FBG 12. The first FBG 12 reflects light in the same wavelength band as the wavelength $\lambda 1$ of the spontaneous emission light emitted by the rare earth elements at a reflectance of 99.5%, for example. Accordingly, the light reflected by the first FBG 12 is input again to the rare earth-doped fiber 13 and amplified. Then, the amplified light is input to the second FBG 15 through the AOM 14 and a part of the light is transmitted through the second FBG 15. In this manner, the first FBG 12 and the second FBG 15 constitute a fabry-perot oscillator, pulsed light is amplified in synchronization with the operation of the AOM 14 repeating the low loss state and the high loss state, and the amplified pulsed light is output as the seed laser light from the second FBG 15. In this case, the wavelength $\lambda 1$ of the seed laser light output from the seed laser light source 10 is 1064 nm, for example, and the pulse repetition frequency is 100 kHz, for example.

If the AOM 14 is controlled to keep a low loss state, the seed laser light source 10 outputs seed laser light that is continuous light and has the same wavelength.

In the seed laser light source 10, the AOM 14 is controlled by a control signal from the controller 60 to control the output of the seed laser light, which is pulsed light or continuous light, and the intensity thereof.

The seed laser light output from the seed laser light source 10 is input to the optical coupler 40.

On the other hand, the pumping light source 20 is constituted by a plurality of laser diodes configured to output pumping light. The intensity of the output pumping light is adjusted by the control signal from the controller 60. The pumping light source 20 outputs pumping light that pumps the rare earth elements of the amplification optical fiber 30, and the pumping light output from the pumping light source 20 is input to the optical coupler 40. The pumping light output from the pumping light source 20 has a wavelength of 975 nm, for example.

The optical coupler 40 has an input port 41 through which the seed laser light from the seed laser light source 10 is input, a pumping light input port 42 through which the pumping light from the pumping light source 20 is input, and an output port 43 through which the seed laser light from the seed laser light source 10 and the pumping light are output. The input port 41 is constituted by a single mode fiber that allows the seed laser light from the seed laser light source 10 to propagate as single mode light. The pumping light input port 42 is constituted by a multi mode fiber that allows the pumping light output from the pumping light source 20 to propagate as multi mode light. The output port 43 is constituted by a double clad fiber having a core, a clad surrounding the core, and a resin clad surrounding the clad, and configured to allow the laser light to propagate through the core as single mode light and allow the pumping light to propagate through the core and the clad as multi mode light. The seed laser light and the pumping light output through the output port 43 are input to the amplification optical fiber 30.

The amplification optical fiber 30 is constituted by a double clad fiber having a core to which the rare earth elements are doped, a clad surrounding the core and a resin clad surrounding the clad. The core allows the seed laser light output from the optical coupler 40 to propagate as single mode light, and allows the pumping light output from the optical coupler 40 to propagate through the core and the clad as multi mode light. When the pumping light passes through the core, the rare earth elements doped in the core are pumped, and the pumped rare earth elements cause stimulated emission by the seed laser light propagating through the core and the seed laser light is amplified by the stimulated emission. The amplified seed laser light is output from the amplification optical fiber 30 as laser light having the wavelength $\lambda 1$. In the amplification optical fiber 30, the core has a diameter of 10 μm, the clad has an outer diameter of 125 μm, and erbium is doped in the core as rare earth elements, for example.

The wavelength converter 71 is constituted by a wavelength converting optical fiber and configured to convert the wavelength of light having an intensity equal to or higher than a predetermined intensity when such light is input. Specifically, when light having the wavelength $\lambda 1$ and an intensity equal to or higher than the predetermined intensity is input, the wavelength converter 71 converts the light input thereto into light having a wavelength $\lambda 2$ that is longer than the wavelength $\lambda 1$ using stimulated Raman scattering. Thus, the wavelength converter 71 outputs light having a longer wavelength than the light input thereto. Such a wavelength converting optical fiber may be an optical fiber that has a core and a clad, and in which a dopant increasing a non-linear optical constant is doped in the core. Examples of such a dopant include germanium and phosphorus. For example, the wavelength converter 71 is a single mode fiber that has a core having a diameter of 5 μm and doped with 7% to 8% by weight of germanium, has a length of 20 m, and is configured to output laser light having the wavelength $\lambda 2$ of 1120 nm when light having an intensity of a peak value of pulsed light of 70 W or higher and the wavelength $\lambda 1$ of 1064 nm is input, and not to perform wavelength conversion when light having an intensity lower than 70 W is input.

If light in the same wavelength band as the seed laser light having the wavelength $\lambda 1$ output from the seed laser light source 10 is input to the wavelength selecting filter 73 through the wavelength converter 71, the wavelength selecting filter 73 transmits the input light whose wavelength is converted to the wavelength $\lambda 2$ by the wavelength converter 71 and suppresses transmission of the input light having the wavelength $\lambda 1$ that is not converted by the wavelength converter 71. Therefore, if laser light of the wavelength $\lambda 1$ having a high intensity is output from the amplification optical fiber 30 and the wavelength thereof is converted to the wavelength $\lambda 2$ by the wavelength converter 71, the laser light having the wavelength $\lambda 2$ input to the wavelength selecting filter 73 is transmitted through the wavelength selecting filter 73. On the other hand, if laser light having the wavelength $\lambda 1$ and a low intensity is output from the amplification optical fiber 30 and the wavelength thereof is not converted by the wavelength converter 71, transmission of the laser light of the wavelength $\lambda 1$ input to the wavelength selecting filter 73 is suppressed in the wavelength selecting filter 73.

The wavelength selecting filter 73 is constituted by a multilayer dielectric filter or a photonic band gap fiber, for example. For example, if laser light having the wavelength $\lambda 1$ of 1064 nm is input to the wavelength converter 71, the wavelength thereof is converted by the wavelength converter 71, and the resulting laser light having the wavelength $\lambda 2$ of 1120 nm is input to the wavelength selecting filter 73, the laser light is transmitted through the wavelength selecting filter 73. On the other hand, if laser light having the wavelength $\lambda 1$ of 1064 nm is input to the wavelength converter 71, the wavelength thereof is not converted by the wavelength converter 71, and the resulting laser light having the wavelength of 1064 nm is input to the wavelength selecting filter 73, transmission of the laser light is suppressed in the wavelength selecting filter 73.

The output section 50 outputs laser light transmitted through the wavelength selecting filter 73 to outside of the fiber laser device 100. If the pulsed seed laser light is output from the seed laser light source 10 as described above, the output section 50 outputs pulsed laser light in synchronization with the seed laser light output from the seed laser light source 10.

The output instruction section 65 inputs, to the controller 60, an output instruction to output laser light from the output section 50.

The controller 60 controls the seed laser light source 10 and the pumping light source 20 according to the output instruction from the output instruction section 65. Specifically, the controller 60 controls the laser oscillator 11 and the AOM 14 in the seed laser light source 10 to control the presence/absence and the intensity of the seed laser light output from the seed laser light source 10 and control whether to output the seed laser light of pulsed light or continuous light. Further, the controller 60 controls the pumping light source 20 to control the presence/absence of the pumping light output from the pumping light source 20 and the intensity of the pumping light output from the pumping light source 20.

Next, an operation of the fiber laser device 100 will be explained referring to FIG. 3.

Figure 3:
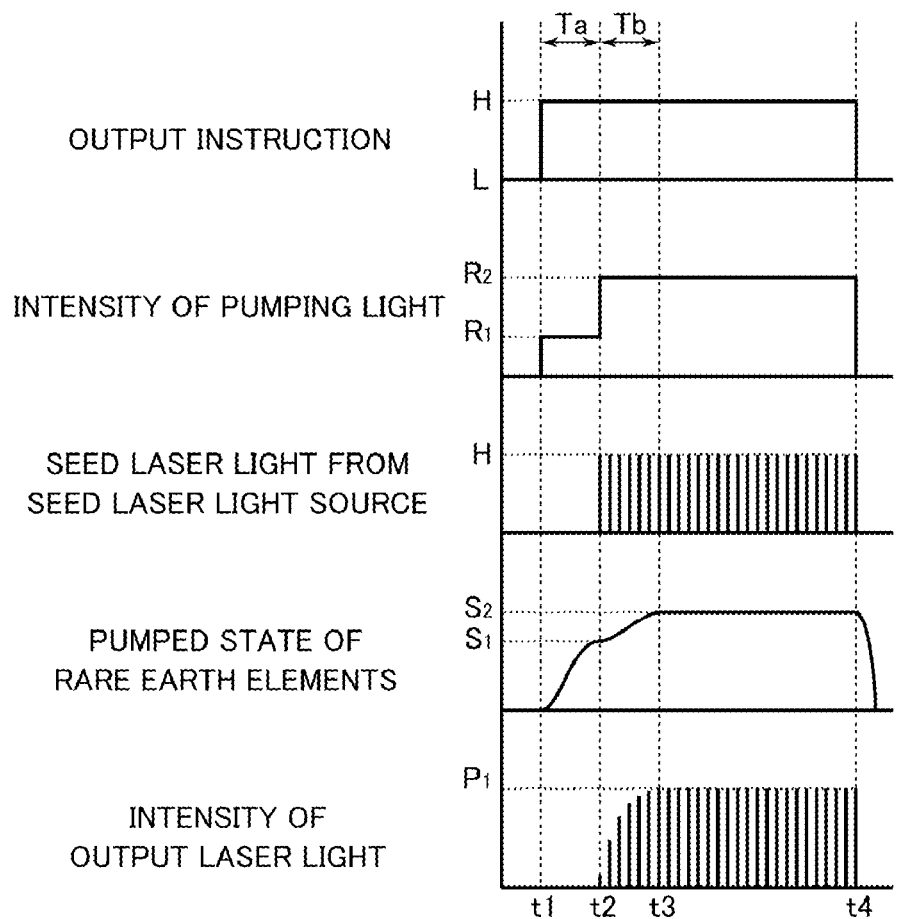
FIG. 3 is a timing chart schematically showing an operation of the fiber laser device of FIG. 1.

FIG. 3 is a timing chart schematically showing an operation of the fiber laser device 100.

FIG. 3 schematically shows an output instruction input to the controller 60 from the output instruction section 65, the intensity of pumping light output from the pumping light source 20, the intensity of the seed laser light output from the seed laser light source 10, the pumped state of the rare earth elements in the amplification optical fiber 30, and the intensity of the laser light output from the output section 50. In FIG. 3, a state H of the output instruction represents a state in which the output instruction is input from the output instruction section 65 to the controller 60. As the intensity of the pumping light is shown to be higher, it is indicated that the pumping light of a higher intensity is output from the pumping light source 20. As the intensity of the seed laser light is shown to be higher, it is indicated that the seed laser light of a higher intensity is output from the seed laser light source 10. As the pumped state of the rare earth elements is shown to be higher, it is indicated that the rare earth elements of the amplification optical fiber 30 are in a higher pumped state. As the intensity of the output laser light is shown to be higher, it is indicated that the intensity of the laser light output from the output section 50 is higher.

First, a power supply, which is not shown, of the fiber laser device 100 is turned on, and power is supplied to the controller 60.

When power is supplied, the controller 60 waits for an output instruction from the output instruction section 65.

Next, when an output instruction is input from the output instruction section 65 to the controller 60 at time t1, the controller 60 controls the pumping light source 20 in a preliminary pumping state to output preliminary pumping light having a predetermined intensity R1 for a predetermined time period Ta. Further, the controller 60 controls the seed laser light source 10 in the preliminary pumping state not to output seed laser light. The control of the seed laser light source 10 at this time also includes not particularly providing any instruction to the seed laser light source 10. Since only the preliminary pumping light is input to the amplification optical fiber 30 at this time, the pumped state of the rare earth elements of the amplification optical fiber 30 becomes gradually higher. The intensity R1 of the preliminary pumping light at this time is 2 W, for example, and the time period Ta is 100 μs, for example.

At the end point of the preliminary pumping state after the predetermined time period Ta passed from time t1, the level of the pumped state of the rare earth elements is a constant pumped state S1.

When the rare earth elements of the amplification optical fiber 30 are pumped, the rare earth elements emit spontaneous emission light including the same wavelength band as the wavelength λ1 of the seed laser light output from the seed laser light source 10. The spontaneous emission light is amplified by the amplification optical fiber 30 and output therefrom. The light output from the amplification optical fiber 30 at this time has a peak value of about 1 W or lower when the intensity R1 of the preliminary pumping light is 2 W as described above. The light output from the amplification optical fiber 30 is input to the wavelength converter 71. However, since the intensity of the light output from the amplification optical fiber 30 at this time is low, the wavelength thereof is not converted by the wavelength converter 71. In this manner, the intensity R1 of the preliminary pumping light is controlled so that even when the spontaneous emission light having the wavelength λ1 emitted by the preliminary pumping light in the amplification optical fiber 30 is amplified and output, the wavelength of the output light is not converted by the wavelength converter 71. The light having the wavelength λ1 that is not converted by the wavelength converter 71 is input to the wavelength selecting filter 73. However, since transmission of light in the same wavelength band as the seed laser light output from the seed laser light source 10 is suppressed at the wavelength selecting filter 73, transmission of the light having the wavelength λ1 output from the wavelength converter 71 by the wavelength selecting filter 73 is suppressed. Accordingly, output of the light from the output section 50 is suppressed in the preliminary pumping state.

Next, at time t2 after the predetermined time period Ta passed from time t1, the controller 60 controls the pumping light source 20 in an output state to output pumping light having a predetermined intensity R2. Further, at time t2, the controller 60 controls the seed laser light source 10 to output pulsed seed laser light having the intensity H and the wavelength λ1. The intensity R2 of the pumping light at this time is 6 W, for example, and the intensity H of the peak value of the seed laser light is 4 W, for example.

In the output state, when the pumping light having the intensity R2 is output from the pumping light source 20 and the seed laser light is output from the seed laser light source 10, the rare earth elements of the amplification optical fiber 30 enter a higher pumped state and cause stimulated emission by the seed laser light, which amplifies the intensity of the seed laser light. Accordingly, the amplified pulsed laser light having the wavelength λ1 is output from the amplification optical fiber 30.

The laser light having the wavelength λ1 output from the amplification optical fiber 30 is input to the wavelength converter 71. The intensity of the laser light input to the wavelength converter 71 is such an intensity that the wavelength of the laser light is converted by the wavelength converter 71. Therefore, the laser light having the wavelength λ1 input to the wavelength converter 71 is converted to laser light having the wavelength λ2 that is longer than the wavelength λ1 by the wavelength converter 71. Thus, in the output state, the controller 60 controls the intensity R2 of the pumping light output from the pumping light source 20 and the intensity H of the seed laser light output from the seed laser light source 10 so that the intensity of the laser light output from the amplification optical fiber 30 is such an intensity that the wavelength of the laser light is converted by the wavelength converter 71.

The laser light having the wavelength λ2 output from the wavelength converter 71 is input to the wavelength selecting filter 73. Since light having the wavelength λ2, which is output from the wavelength converter 71 in which the wavelength of light in the same wavelength band as the seed laser light having the wavelength λ1 output from the seed laser light source 10 has been converted, is transmitted through the wavelength selecting filter 73, transmission of the laser light having the wavelength λ2 input to the wavelength selecting filter 73 is transmitted by the wavelength selecting filter 73.

The laser light transmitted through the wavelength selecting filter 73 is output from the output section 50.

However, the intensity of the laser light output from the output section 50 does not reach an intensity P1 of the laser light that should be output at a time point shortly after time t2. Then, at time t3 after a time period Tb passed from time t2, the pumped state of the rare earth elements reaches S2. In this manner, the laser light having the intensity P1 that should be output from the output section 50 is output, and the laser light output is stabilized. The time period (time period Tb) from time t2 to time t3 is the rise time of the laser light output from the output section 50. For example, in the case of the first output of the laser light after power-on, if the intensity R1 of the preliminary pumping light is 2 W, the time period Ta is 100 μs, the intensity R2 of the pumping light is 6 W, and the intensity H of the peak value of the seed laser light is 4 W as described above, the time period Tb is 50 μs or less.

Next, when the output instruction stops being input from the output instruction section 65 at time t4, the controller stops the output of the seed laser light from the seed laser light source 10 and the output of the pumping light from the pumping light source 20. Accordingly, the laser light output from the output section 50 is stopped. Then, the controller 60 waits again for an output instruction from the output instruction section 65.

According to the fiber laser device 100 of this embodiment, when an output instruction is input from the output instruction section 65 to the controller 60, the controller 60 controls the pumping light source 20 and the seed laser light source 10 in the preliminary pumping state so as not to output the seed laser light from the seed laser light source 10 and so as to input the preliminary pumping light to the amplification optical fiber 30 for the time period Ta. Accordingly, the pumped state of the rare earth elements of the amplification optical fiber 30 becomes gradually higher. The amplification optical fiber 30 is configured to amplify the seed laser light output from the seed laser light source 10 by the stimulated emission of the rare earth elements pumped by the pumping light. However, in the preliminary pumping state, since the seed laser light is not input to the amplification optical fiber 30, only the spontaneous emission light emitted by the pumped rare earth elements is output from the amplification optical fiber 30. It is known that the spontaneous emission light has a wide spectrum width and a small peak value of the intensity. In addition, in the preliminary pumping state, the intensity of the preliminary pumping light is controlled so that even when light having the wavelength $\lambda 1$ obtained by amplifying the spontaneous emission light is output from the amplification optical fiber 30, the wavelength of the output light having the wavelength $\lambda 1$ is not converted to light having the wavelength $\lambda 2$ by the wavelength converter 71. Thus, even when light obtained by amplifying the spontaneous emission light is output from the amplification optical fiber 30, transmission of the light having the wavelength $\lambda 1$ output from the wavelength converter 71 and input to the wavelength selecting filter 73 is suppressed by the wavelength selecting filter 73. Accordingly, output of unnecessary light from the output section 50 is suppressed in the preliminary pumping state.

In the output state following the preliminary pumping state, the controller 60 controls the pumping light source 20 and the seed laser light source 10 so that the pumping light and the seed laser light that has the wavelength $\lambda 1$ are input to the amplification optical fiber 30. In the amplification optical fiber 30 in this state, the rare earth elements pumped by the pumping light cause stimulated emission by the seed laser light, and the seed laser light is amplified by the stimulated emission and output as the laser light having the wavelength $\lambda 1$. The seed laser light source 10 and the pumping light source 20 are controlled so that the laser light output from the amplification optical fiber 30 at this time has such an intensity that the laser light is wavelength-converted by the wavelength converter 71 to the laser light having the wavelength $\lambda 2$ that is longer than the wavelength $\lambda 1$. The laser light having the wavelength $\lambda 2$ obtained by wavelength conversion by the wavelength converter 71 and output therefrom is input to the wavelength selecting filter 73, is transmitted through the wavelength selecting filter 73 and is output from the output section 50. Since the rare earth elements of the amplification optical fiber 30 are pumped in the preliminary pumping state, the laser light output in the output state has a short rise time Tb.

Second Embodiment

Next, a second embodiment of the invention will be explained in detail referring to FIG. 4. Here, components that are identical or similar to those in the first embodiment are indicated by the same reference numerals and the same explanation will not be repeated. This embodiment is an embodiment of a fiber laser device using the fiber laser device 100 explained in the first embodiment.

Figure 4:
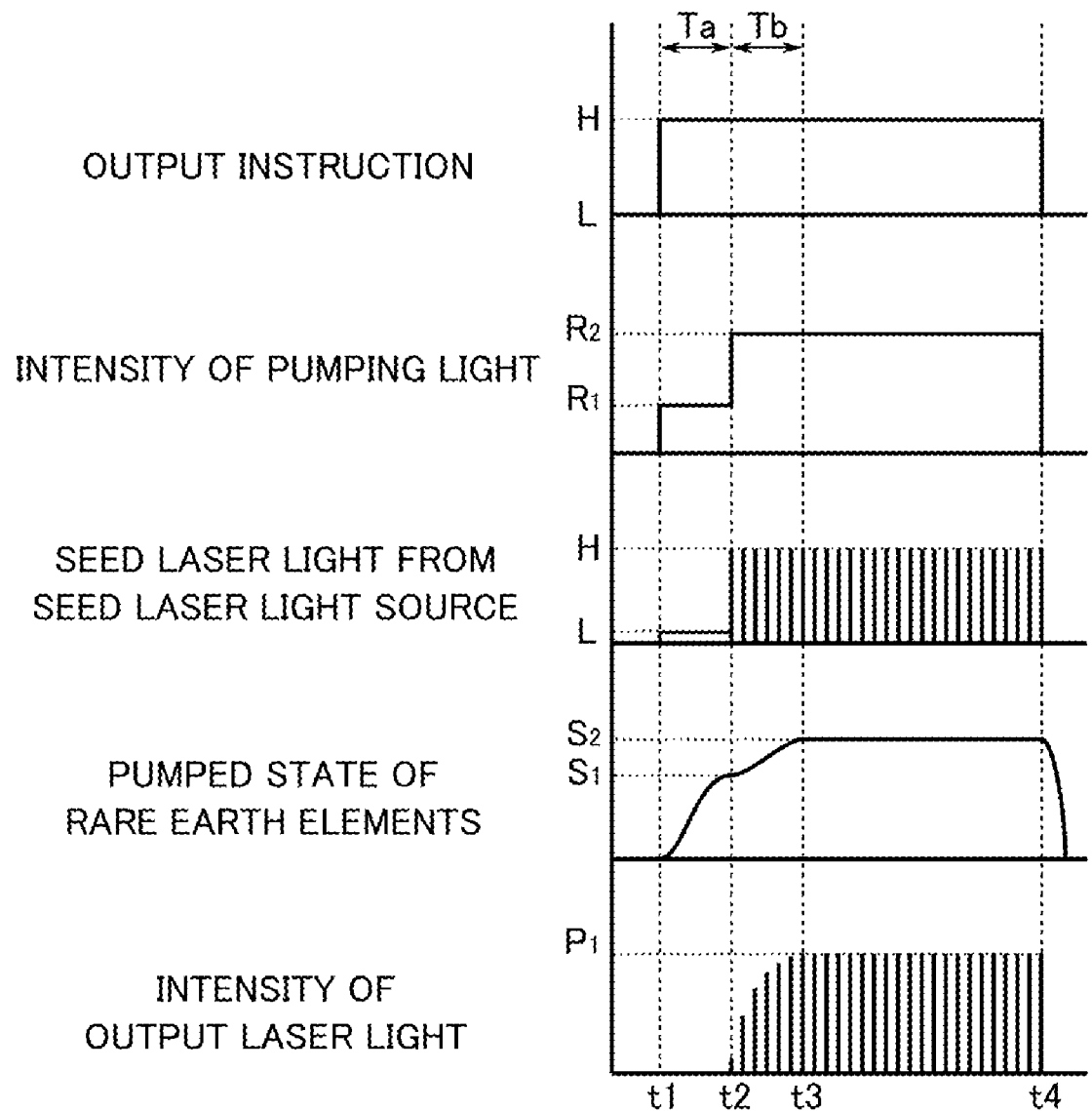
FIG. 4 is a timing chart schematically showing an operation of a fiber laser device according to a second embodiment of the invention.

FIG. 4 is a timing chart showing an operation of a fiber laser device 100 according to the second embodiment of the invention.

Figure 5:
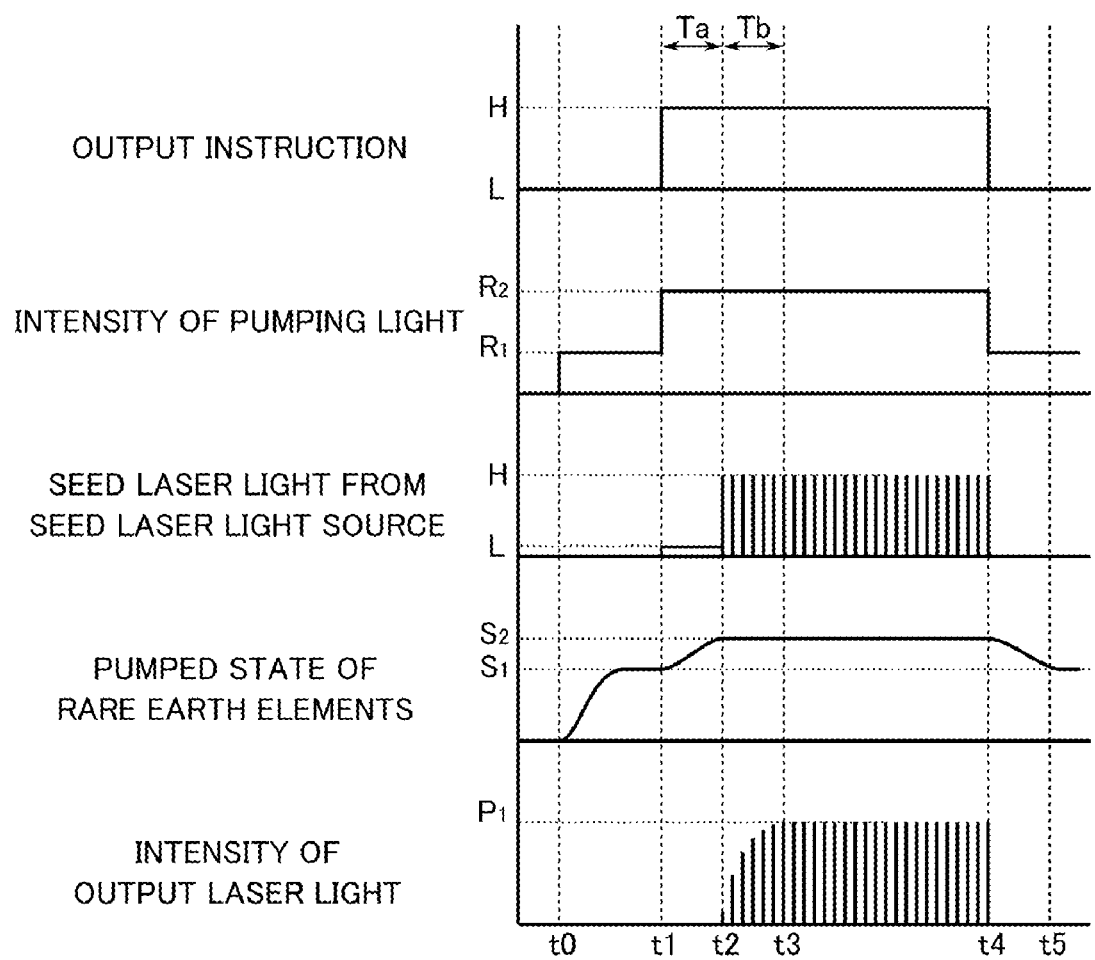
FIG. 5 is a timing chart schematically showing an operation of a fiber laser device according to a third embodiment of the invention.

As shown in FIG. 5, when an output instruction is input to the controller 60 from the output instruction section 65 at time t1, the controller 60 controls the pumping light source in the preliminary pumping state to output preliminary pumping light having an intensity R1 for a predetermined time period Ta and controls the seed laser light source 10 in the preliminary pumping state to output weak seed laser light having a predetermined constant intensity L. The weak seed laser light is continuous light having a wavelength equal to that of the seed laser light in the first embodiment. Accordingly, this embodiment differs from the first embodiment in that weak seed laser light is output from the seed laser light source 10 in the preliminary pumping state. The intensity L of the weak seed laser light is 1 W, for example.

Next, the intensities of the preliminary pumping light and the weak seed laser light will be explained. In this embodiment, in the preliminary pumping state, the preliminary pumping light is input from the pumping light source 20 to the amplification optical fiber 30 and the weak seed laser light having a wavelength $\lambda 1$ is input from the seed laser light source 10 to the amplification optical fiber 30. Accordingly, in the amplification optical fiber 30, the rare earth elements are brought in a highly pumped state by the preliminary pumping light and the rare earth elements cause stimulated emission by the weak seed laser light. The weak seed laser light is amplified by the stimulated emission of the rare earth elements, output from the amplification optical fiber 30 as laser light having the wavelength $\lambda 1$, and input to the wavelength converter 71. The laser light input to the wavelength converter 71 at this time has such an intensity that the wavelength of the laser light is not converted by the wavelength converter 71. That is, in the preliminary pumping state, the intensities of the preliminary pumping light and the weak seed laser light are controlled to be such intensities that even when laser light is output from the amplification optical fiber, the wavelength of the laser light is not converted by the wavelength converter 71.

The laser light having the wavelength $\lambda 1$ output from the amplification optical fiber is input to the wavelength selecting filter 73. However, since transmission of light in the same wavelength band as the seed laser light output from the seed laser light source 10 is suppressed at the wavelength selecting filter 73, transmission of the light having the wavelength $\lambda 1$ output from the wavelength converter 71 through the wavelength selecting filter 73 is suppressed. Accordingly, output of the light from the output section 50 is suppressed in the preliminary pumping state.

Then, at time t2 after the predetermined time period Ta passed from time t1, the controller 60 controls the pumping light source 20 and the seed laser light source 10 to be in an output state.

According to the fiber laser device 100 of this embodiment, the seed laser light is input to the amplification optical fiber 30 in the preliminary pumping state, and it is thus possible to balance between the pumping of the rare earth elements by the pumping light and relaxation of the rare earth elements by the seed laser light. Therefore, it is possible to prevent the rare earth elements from being pumped until they become unstable and prevent unintended laser oscillation in the preliminary pumping state.

In addition, in the amplification optical fiber 30 in the preliminary pumping state, the weak laser light is amplified by the stimulated emission of the rare earth elements, and output as the laser light having the wavelength λ1. However, the weak laser light output from the seed laser light source 10 and the preliminary pumping light output from the pumping light source 20 have such intensities that the laser light output from the amplification optical fiber 30 is not wavelength-converted from the light having the wavelength λ1 to the light having the wavelength λ2 by the wavelength converter 71. Thus, transmission of the laser light input from the wavelength converter 71 to the wavelength selecting filter 73 is suppressed at the wavelength selecting filter 73. Accordingly, output of unnecessary light can be suppressed in the preliminary pumping state.

Third Embodiment

Next, a third embodiment of the invention will be explained in detail referring to FIG. 5. Here, components that are identical or similar to those in the first or second embodiment are indicated by the same reference numerals and the same explanation will not be repeated. This embodiment is an embodiment of a fiber laser device using the fiber laser device 100 explained in the first embodiment.

FIG. 5 is a timing chart showing an operation of a fiber laser device 100 according to the third embodiment of the invention.

First at time to, a power supply, which is not shown, of the fiber laser device 100 is turned on, and power is supplied to the controller 60.

When power is supplied, the controller 60 controls the pumping light source 20 in a first preliminary pumping state to output first preliminary pumping light having a predetermined intensity R1 from the pumping light source 20. Further, the controller 60 controls the seed laser light source 10 in the first preliminary pumping state not to output seed laser light. The control of the seed laser light source 10 at this time also includes not particularly providing any instruction to the seed laser light source 10. Since only the preliminary pumping light is input to the amplification optical fiber 30 in this manner, the pumped state of the rare earth elements of the amplification optical fiber 30 becomes gradually higher. The intensity R1 of the first preliminary pumping light is equal to the intensity R1 of the preliminary pumping light in the first embodiment. Accordingly, this embodiment differs from the first and second embodiments in that the first preliminary pumping light is output before an output instruction is input from the output instruction section 65.

As described above, the level of the pumped state of the rare earth elements is a constant pumped state S1 in the first preliminary pumping state. The controller keeps the first preliminary pumping state and waits for an output instruction from the output instruction section 65.

In the first preliminary pumping state, the amplification optical fiber 30 emits spontaneous emission light in the same wavelength band as the wavelength λ1 of the seed laser light and the spontaneous emission light is amplified by the amplification optical fiber 30 and output therefrom. The peak value of the light output from the amplification optical fiber at this time is 1 W or less if the intensity R1 of the first preliminary pumping light is 2 W, which is equal to the intensity R1 of the preliminary pumping light in the first embodiment. The light output from the amplification optical fiber 30 is input to the wavelength converter 71. However, the intensity of the first preliminary pumping light is controlled so that even when the spontaneous emission light having the wavelength λ1 emitted by the first preliminary pumping light in the amplification optical fiber 30 is amplified and output, the wavelength of the output light is not converted by the wavelength converter 71, similarly to the preliminary pumping state in the first embodiment. Therefore, transmission of the light having the wavelength λ1 output from the wavelength converter 71 through the wavelength selecting filter 73 is suppressed. Accordingly, output of the light from the output section 50 is suppressed in the first preliminary pumping state.

Next, when an output instruction is input from the output instruction section 65 to the controller 60 at time t1, the controller 60 controls the pumping light source 20 in a second preliminary pumping state to output second preliminary pumping light having an intensity R2 for a predetermined time period Ta, and controls the seed laser light source 10 in the second preliminary pumping state to output weak seed laser light having a predetermined constant intensity L. The intensity R2 of the second preliminary pumping light is an intensity higher than that of the first preliminary pumping light and equal to the intensity R2 of the pumping light in the first embodiment. The weak seed laser light is continuous light having a wavelength and an intensity equal to those of the seed laser light of the second embodiment.

When the second preliminary pumping light is input from the pumping light source 20 to the amplification optical fiber 30 and the weak laser light having the wavelength λ1 is input from the seed laser light source 10 to the amplification optical fiber 30 in this manner, the pumped state of the rare earth elements becomes higher by the second preliminary pumping light and the rare earth elements cause stimulated emission by the weak seed laser light in the amplification optical fiber 30. The weak seed laser light is amplified by the stimulated emission of the rare earth elements, output from the amplification optical fiber 30 as laser light having the wavelength λ1, and input to the wavelength converter 71. However, the laser light input to the wavelength converter 71 at this time has such an intensity that the wavelength of the laser light is not converted by the wavelength converter 71. That is, in the second preliminary pumping state, the intensity R2 of the second preliminary pumping light and the intensity L of the weak seed laser light are controlled to be such intensities that even when laser light is output from the amplification optical fiber, the wavelength of the laser light is not converted by the wavelength converter 71. Accordingly, output of the light from the output section 50 is suppressed in the second preliminary pumping state.

Then, at time t2 after the predetermined time period Ta passed from time t1, the controller 60 controls the pumping light source 20 and the seed laser light source 10 to be in an output state, so that pumping light having the intensity R2 equal to the intensity of the second preliminary pumping light is output from the pumping light source 20 and seed laser light having the intensity H is output from the seed laser light source 10. In this manner, the laser light output from the output section 50 rises during a period from time t2 to time t3, and laser light having an intensity P1 is output at time t3.

Next, when the output instruction stops being input from the output instruction section 65 at time t4, the controller controls the pumping light source 20 and the seed laser light source 10 to be in the first preliminary pumping state. Accordingly, the pumped state of the rare earth elements of the amplification optical fiber becomes gradually lower and the pumped state reaches S1 at time t5 after a predetermined period. Thus, the controller 60 waits again for an output instruction from the output instruction section 65.

According to the fiber laser device 100 according to this embodiment, the pumped state of the rare earth elements becomes higher in the output state, and thus it is possible to further shorten the rise time of the laser light.

Although the invention has been described above by reference to the first to third embodiments as examples, the invention is not limited thereto.

For example, although a laser output device of fabry-perot type is used as the seed laser light source 10 in the first to third embodiments, a laser output device of fibering type or laser diodes may be used.

In addition, although the seed laser light output from the seed laser light source 10 is pulsed light in the output state in the first to third embodiments, the seed laser light may be continuous light.

In the first and second embodiments, the intensity of the preliminary pumping light output from the pumping light source 20 in the preliminary pumping state is lower than that of the pumping light output from the pumping light source 20 in the output state. However, the invention is not limited thereto. For example, the preliminary pumping light output from the pumping light source 20 in the preliminary pumping state and the pumping light output from the pumping light source 20 in the output state may have equal intensities. In this case, the load of the controller can be reduced since the pumping light source 20 can be configured to be in the same state in the output preparation state and in the output state.

In the third embodiment, the intensity of the first preliminary pumping light output from the pumping light source 20 in the first preliminary pumping state is lower than that of the pumping light output from the pumping light source 20 in the output state. However, the invention is not limited thereto. For example, the first preliminary pumping light output from the pumping light source 20 in the first preliminary pumping state and the pumping light output from the pumping light source 20 in the output state may have equal intensities.

In the third embodiment, the intensity of the second preliminary pumping light output from the pumping light source 20 in the second preliminary pumping state is equal to that of the pumping light output from the pumping light source 20 in the output state. However, the invention is not limited thereto. For example, the second preliminary pumping light output from the pumping light source 20 in the second preliminary pumping state may have a lower intensity than the pumping light output from the pumping light source 20 in the output state.

In the first and second embodiments, the preliminary pumping state is a period before the output state. However, the invention is not limited thereto. The preliminary pumping state does not have to be a period before the output state, and preliminary pumping light may be output from the pumping light source 20 as the preliminary pumping state in all periods except for the output state.

Similarly, in the third embodiment, the second preliminary pumping state is a period before the output state. However, the invention is not limited thereto, and the second preliminary pumping state does not have to be a period before the output state.

Further, the amplification optical fiber 30 allows the seed laser light to propagate as single mode light. However, the amplification optical fiber 30 may be configured to allow light of a plurality of modes to propagate.

The output instruction section 65 may have any configuration that inputs an output instruction to the controller 60. For example, the output instruction section 65 may be configured to input an output instruction, which is generated outside of the fiber laser device, to the controller 60.

INDUSTRIAL APPLICABILITY

According to the invention, a fiber laser device capable of shortening the rise time of output laser light and suppressing light output except for the output period can be provided.

DESCRIPTION OF REFERENCE NUMERALS

10 . . . seed laser light source
11 . . . pumping light source
12 . . . first FBG
13 . . . rare earth-doped fiber
14 . . . AOM
15 . . . second FBG
20 . . . pumping light source
30 . . . amplification optical fiber
40 . . . optical coupler
50 . . . output section
60 . . . controller
65 . . . output instruction section
71 . . . wavelength converter
73 . . . wavelength selecting filter

The invention claimed is:

1. A fiber laser device comprising:
a seed laser light source configured to output seed laser light;
a pumping light source configured to output pumping light;
an amplification optical fiber to which the seed laser light and the pumping light are input and which is configured to amplify the seed laser light and output the amplified light as laser light, wherein the amplification optical fiber is doped with rare earth elements that are pumped by the pumping light;
a wavelength converter to which the laser light output from the amplification optical fiber is input and which is configured to convert a wavelength of light having an intensity equal to or higher than a predetermined intensity;
a wavelength selecting filter to which the laser light output from the wavelength converter is input and which is configured to transmit light whose wavelength is converted by the wavelength converter and to suppress transmission of light whose wavelength is not converted by the wavelength converter when light in the same wavelength band as the seed laser light is input to the wavelength converter;
an output section configured to output laser light output from the wavelength selecting filter; and
a controller configured to control at least the seed laser light source and the pumping light source, wherein
the controller controls the seed laser light source and the pumping light source to change from a preliminary pumping state to an output state,
in the preliminary pumping state, the seed laser light is not output from the seed laser light source, the pumping light is output from the pumping light source, and the pumping light has such an intensity that the wavelength of light emitted by the pumping light in the amplification optical fiber is not converted by the wavelength converter, and
in the output state, the seed laser light is output from the seed laser light source, the pumping light is output from the pumping light source, and the seed laser light and the pumping light have such intensities that the wavelength of the laser light output from the amplification optical fiber is converted by the wavelength converter.

2. A fiber laser device comprising:
a seed laser light source configured to output seed laser light;
a pumping light source configured to output pumping light;
an amplification optical fiber to which the seed laser light and the pumping light are input and which is configured to amplify the seed laser light and output the amplified light as laser light, wherein the amplification optical fiber is doped with rare earth elements that are pumped by the pumping light;
a wavelength converter to which the laser light output from the amplification optical fiber is input and which is configured to convert a wavelength of light having an intensity equal to or higher than a predetermined intensity;
a wavelength selecting filter to which the laser light output from the wavelength converter is input and which is configured to transmit light whose wavelength is converted by the wavelength converter and to suppress transmission of light whose wavelength is not converted by the wavelength converter when light in the same wavelength band as the seed laser light is input to the wavelength converter;
an output section configured to output laser light output from the wavelength selecting filter; and
a controller configured to control at least the seed laser light source and the pumping light source, wherein
the controller controls the seed laser light source and the pumping light source to change from a preliminary pumping state to an output state,
in the preliminary pumping state, the seed laser light is output from the seed laser light source, the pumping light is output from the pumping light source, and the seed laser light and the pumping light have such intensities that the wavelength of the laser light output from the amplification optical fiber is not converted by the wavelength converter, and
in the output state, the seed laser light is output from the seed laser light source, the pumping light is output from the pumping light source, and the seed laser light and the pumping light have such intensities that the wavelength of the laser light output from the amplification optical fiber is converted by the wavelength converter.

3. The fiber laser device according to claim 1 or 2, wherein the controller controls the seed laser light source and the pumping light source to change from the output state to the preliminary pumping state.

4. The fiber laser device according to claim 2, wherein the seed laser light in the output state is pulsed light and the seed laser light in the preliminary pumping state is continuous light.

5. The fiber laser device according to claim 1 or 2, wherein the intensity of the pumping light in the preliminary pumping state is equal to or lower than the intensity of the pumping light in the output state.

6. A fiber laser device comprising:
a seed laser light source configured to output seed laser light;
a pumping light source configured to output pumping light;
an amplification optical fiber to which the seed laser light and the pumping light are input and which is configured to amplify the seed laser light and output the amplified light as laser light, wherein the amplification optical fiber is doped with rare earth elements that are pumped by the pumping light;
a wavelength converter to which the laser light output from the amplification optical fiber is input and which is configured to convert a wavelength of light having an intensity equal to or higher than a predetermined intensity;
a wavelength selecting filter to which the laser light output from the wavelength converter is input and which is configured to transmit light whose wavelength is converted by the wavelength converter and to suppress transmission of light whose wavelength is not converted by the wavelength converter when light in the same wavelength band as the seed laser light is input to the wavelength converter;
an output section configured to output laser light output from the wavelength selecting filter; and
a controller configured to control at least the seed laser light source and the pumping light source, wherein
the controller controls the seed laser light source and the pumping light source to change from a first preliminary pumping state to a second preliminary pumping state and from the second preliminary pumping state to an output state,
in the first preliminary pumping state, the seed laser light is not output from the seed laser light source, the pumping light is output from the pumping light source, and the pumping light has such an intensity that the wavelength of light emitted by the pumping light in the amplification optical fiber is not converted by the wavelength converter,
in the second preliminary pumping state, the seed laser light is output from the seed laser light source, the pumping light is output from the pumping light source, and the seed laser light and the pumping light have such intensities that the wavelength of the laser light output from the amplification optical fiber is not converted by the wavelength converter, and
in the output state, the seed laser light is output from the seed laser light source, the pumping light is output from the pumping light source, and the seed laser light and the pumping light have such intensities that the wavelength of the laser light output from the amplification optical fiber is converted by the wavelength converter.

7. The fiber laser device according to claim 6, wherein the controller controls the seed laser light source and the pumping light source to change from the output state to the first preliminary pumping state.

8. The fiber laser device according to claim 6 or 7, wherein the seed laser light in the output state is pulsed light and the seed laser light in the second preliminary pumping state is continuous light.

9. The fiber laser device according to claim 6 or 7, wherein the intensity of the pumping light in the first preliminary pumping state is equal to or lower than the intensity of the pumping light in the output state.

10. The fiber laser device according to claim 6 or 7, wherein the intensity of the pumping light in the second preliminary pumping state is equal to the intensity of the pumping light in the output state.

* * * * *